(12) United States Patent
Atwood

(10) Patent No.: US 10,589,466 B2
(45) Date of Patent: Mar. 17, 2020

(54) SYSTEMS AND METHODS FOR IMPLEMENTING MULTI-LAYER ADDRESSABLE CURING OF ULTRAVIOLET (UV) LIGHT CURABLE INKS FOR THREE DIMENSIONAL (3D) PRINTED PARTS AND COMPONENTS

(71) Applicant: XEROX Corporation, Norwalk, CT (US)

(72) Inventor: Christopher Atwood, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 733 days.

(21) Appl. No.: 14/634,821

(22) Filed: Feb. 28, 2015

(65) Prior Publication Data

US 2016/0250807 A1 Sep. 1, 2016

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/112* (2017.08); *B29C 64/386* (2017.08);
(Continued)

(58) Field of Classification Search
CPC ............ B29C 67/0085; B29C 67/0096; B29C 67/0055; B29C 67/0051; B29C 67/0059; B29C 67/0062; B29C 67/0066; B29C 67/007; B29C 67/0074; B29C 67/0077; B29C 67/0081; B29C 67/0088; B29C 67/0092; B29C 64/10; B29C 64/124; B29C 64/153; B29C 64/165; B29C 64/386;
(Continued)

(56) References Cited

U.S. PATENT DOCUMENTS

| | | | | |
|---|---|---|---|---|
| 5,182,056 A | * | 1/1993 | Spence | G01J 1/4257 118/423 |
| 5,184,307 A | * | 2/1993 | Hull | G01J 1/4257 156/273.3 |

(Continued)

*Primary Examiner* — Robert C Dye
*Assistant Examiner* — Taryn Trace Willett
(74) *Attorney, Agent, or Firm* — Caesar Rivise, PC

(57) ABSTRACT

A system and method are provided for implementing adjustable curing of layers of deposition materials, including ultraviolet (UV) light or photo curable ink layers, used in the formation and/or manufacture of three-dimensional (3D) printed parts, objects and components, particularly those parts, objects and components formed in 3D printers and additive material manufacturing systems such as 3D jetted ink printing systems. A multi-layer (or layer-by-layer) history of the deposited materials is developed by which to adjust an intensity of an addressable curing unit to provide complete curing to a particular layer without introducing damaging effects that may be caused by over curing the particular layer. The applied curing energy will differently penetrate a number of layers based on constitutions and/or colors of the individual layers in the number of layers to be penetrated. Discrete addressable curing of the individual layered components provides correct curing to the individual layers.

8 Claims, 4 Drawing Sheets

(51) Int. Cl.
*B33Y 30/00* (2015.01)
*B33Y 50/00* (2015.01)
*B29C 64/112* (2017.01)
*B29C 64/386* (2017.01)
*B29L 9/00* (2006.01)

(52) U.S. Cl.
CPC ............ *B33Y 10/00* (2014.12); *B33Y 30/00* (2014.12); *B33Y 50/00* (2014.12); *B29L 2009/00* (2013.01)

(58) Field of Classification Search
CPC ... B29C 64/393; B29C 64/129; B29C 64/135; B29C 64/264; B29C 64/268; B29C 64/277; B29C 64/282; B33Y 10/00; B33Y 30/00; B33Y 40/00; B33Y 99/00
See application file for complete search history.

(56) References Cited

U.S. PATENT DOCUMENTS

| | | | | | |
|---|---|---|---|---|---|
| 5,427,733 | A * | 6/1995 | Benda | | B22F 3/1055 264/40.1 |
| 5,776,409 | A * | 7/1998 | Almquist | | B29C 64/40 118/407 |
| 6,366,825 | B1 * | 4/2002 | Smalley | | G06T 17/00 264/401 |
| 6,574,523 | B1 * | 6/2003 | Hanna | | B29C 64/135 345/420 |
| 6,658,314 | B1 * | 12/2003 | Gothait | | B29C 67/0092 264/409 |
| 6,730,256 | B1 * | 5/2004 | Bloomstein | | B29C 64/40 264/401 |
| 6,782,303 | B1 * | 8/2004 | Fong | | B29C 67/0059 700/118 |
| 7,433,627 | B2 * | 10/2008 | German | | B41J 11/002 347/102 |
| 9,434,838 | B2 * | 9/2016 | Jung | | C08L 33/08 |
| 2002/0086247 | A1 * | 7/2002 | Coe | | B33Y 50/02 430/328 |
| 2004/0187714 | A1 * | 9/2004 | Napadensky | | B29C 41/48 101/35 |
| 2004/0200816 | A1 * | 10/2004 | Chung | | G05D 23/1919 219/121.83 |
| 2009/0121393 | A1 * | 5/2009 | Abe | | B22F 3/1055 264/497 |
| 2010/0125356 | A1 * | 5/2010 | Shkolnik | | G06T 1/00 700/98 |
| 2013/0001834 | A1 * | 1/2013 | El-Siblani | | B29C 67/0062 264/401 |
| 2013/0040091 | A1 * | 2/2013 | Dikovsky | | B29C 67/0059 428/68 |
| 2014/0255666 | A1 * | 9/2014 | Stucker | | B29C 67/0081 428/201 |
| 2014/0306380 | A1 * | 10/2014 | El-Siblani | | B29C 67/0088 264/401 |
| 2015/0064048 | A1 * | 3/2015 | Bessac | | B22F 3/24 419/29 |
| 2015/0093465 | A1 * | 4/2015 | Page | | B29C 67/0088 425/132 |
| 2015/0165556 | A1 * | 6/2015 | Jones | | B28B 1/001 264/482 |
| 2015/0174658 | A1 * | 6/2015 | Ljungblad | | B33Y 10/00 419/55 |
| 2015/0258736 | A1 * | 9/2015 | Chen | | B29C 67/0088 700/98 |
| 2016/0096236 | A1 * | 4/2016 | Cho | | G01J 5/0806 219/76.12 |
| 2016/0158889 | A1 * | 6/2016 | Carter | | G02B 6/42 219/76.12 |
| 2016/0221262 | A1 * | 8/2016 | Das | | G03F 7/70416 |
| 2016/0266573 | A1 * | 9/2016 | Bheda | | G05B 19/4099 |
| 2016/0332379 | A1 * | 11/2016 | Paternoster | | B22F 3/1055 |
| 2016/0332380 | A1 * | 11/2016 | De Pena | | B29C 67/0088 |
| 2016/0332384 | A1 * | 11/2016 | De Pena | | B33Y 30/00 |
| 2016/0339642 | A1 * | 11/2016 | Donovan | | B29C 67/0088 |
| 2017/0028644 | A1 * | 2/2017 | Evans | | B29C 70/384 |

* cited by examiner

SYSTEMS AND METHODS FOR IMPLEMENTING MULTI-LAYER ADDRESSABLE CURING OF ULTRAVIOLET (UV) LIGHT CURABLE INKS FOR THREE DIMENSIONAL (3D) PRINTED PARTS AND COMPONENTS

BACKGROUND

1. Field of the Disclosed Embodiments

This disclosure relates to systems and methods for implementing adjustable curing of ultraviolet (UV) light or photo curable ink layers in the formation and/or manufacture of three-dimensional (3D) printed parts and components, particularly those parts and components formed in 3D jetted ink printing systems.

2. Related Art

Three-dimensional or 3D printing generally refers to a broad class of techniques (also referred to as "additive material manufacturing" or AM techniques) that are usable for producing three-dimensional parts, objects or components ("3D printed parts") often through a repetitive layer-by-layer material deposition process. 3D printing techniques employ one or more processes that appear, in many respects, similar to well-known comparable processes for forming two-dimensional (2D) printed images on image receiving media substrates. The significant differences in the output structures produced by the 3D printing techniques, even as those techniques may be adapted from loosely related 2D printing processes are generally based on (1) a composition of the deposited materials that are used to form the output 3D printed parts from the 3D printer; and (2) a number of passes made by the "print" heads in depositing comparatively large numbers of successive layers of the deposition material to build up the layers to the form of the output 3D printed parts. In sophisticated 3D printers, an ability of the printing apparatus to translate among multiple axes such as, for example, at the end of a robotic arm, provides a capacity for the 3D printer to produce 3D printed parts of virtually any shape according to computer control in the copying of a 3D model, and/or in translating modeling information to a detailed digital data source file. A large number of additive material manufacturing or 3D printing processes are now available. Principal distinguishing characteristic between the multiplicity of these 3D printing processes are in the manner in which the layers are deposited to create the output 3D printed parts and in the materials that are used to form the output 3D printed parts.

Certain of the 3D printing techniques melt or soften materials to produce the layers through using techniques such as, for example, selective laser melting or sintering. Others of the 3D printing techniques cure liquid materials using technologies for the deposition of those liquid materials such as stereolithography. Separately, in for example laminated object manufacturing, thin layers of paper, polymers or metals, may be cut to shape and joined together to form the output 3D printed parts. Each method has certain advantages, which are often balanced by certain disadvantages, making certain of these 3D printing techniques more or less acceptable in certain 3D printed part manufacturing scenarios. Principal considerations in choosing a particular 3D printing technique, and a system for carrying into effect that 3D printing technique, include speed of object production, device costs, device flexibility, and costs and choices of constituent materials for the production of the 3D printed parts, including, for example color gamut in the available materials when the 3D printed parts are intended to present particular color schemes. Some additive material manufacturing techniques are capable of using multiple materials in the course of "printing" or otherwise constructing the output 3D printed parts. These techniques are often able to print in multiple colors and color combinations simultaneously to produce output 3D printed parts that may then not generally require additional painting/finishing.

3D printers, in general, can print with a broad spectrum of different materials. These materials include, for example, extruded plastics and thermoplastics, high-density polyethylenes, certain metals (including sintered metals, metal powders and/or metal alloys), glued powder mixtures, ceramic materials and ceramic matrix composites, modeling clays, plasters and certain ink-like materials, including photo curable and/or ultraviolet (UV) light curable inks with high concentrations of solid components in solution. 3D printers can even be used to deposit layers of compositions of edible materials for producing foodstuffs in the culinary arts.

SUMMARY OF DISCLOSED SUBJECT MATTER

The disclosed schemes will focus on UV-curable jetted inks (with solid material particles of varying sizes and pigments suspended in clear and/or pigmented liquid suspensions) for producing 3D output objects via an additive material manufacturing process in which individual layers are jetted to "build up" a three-dimensional (3D) output object on a base structural component. The disclosed techniques, therefore, are loosely based on schemes that are usable in the production of 2D images on image receiving media substrates adapted for the production of 3D objects.

In the disclosed schemes, a 3D printer creates an output object one layer at a time by spreading individual and sequential layers of printing material on previously deposited layers in an additive process using an inkjet-like printing process and/or print head. In this process, the depositing of the layers is repeated until every layer has been printed. This technique allows the printing of full color prototypes of all shapes, including those which are comprised of certain overhanging layers that may "shadow" previously-deposited layers.

Inkjet printer systems spray materials onto a build tray in ultra-thin layers (of, for example, between 16 and 30 μm) until the 3D output object is completed. Each layer may be heat or photo curable through the application of light, including UV light, after it is jetted, producing fully cured models that can be handled and used immediately, without being subjected to post-curing processing of the finished objects prior to handling and use.

Correct curing of 3D printed parts is a challenge that all UV ink 3D printers encounter. Curing thoroughly enough without over-curing is difficult with the wide range of UV ink colors available to 3D printers. Addressable curing is important in 2D image forming for, for example, maintaining formed color images. As an example, if a clearcoat ink is over cured, it can be caused to yellow in the curing process. Similarly, other colors may be "discolored" if over cured. This reduces image quality based on random discoloration of the materials deposited on the image receiving media substrate. If under cured, the deposited image materials may be caused to smudge, smear or the like, thereby also affecting image quality on the output images.

In 3D printing, there are additional issues. Under curing or over curing affect physical properties of the 3D output object. These adversely affected properties may include strength and hardness. Failure to surface cure the finished 3D output object may result in the introduction of defects into the surface of the finished 3D output object through simple post-processing handling and/or manipulation of the allegedly finished 3D output object. Additionally, because certain of the deposition materials for producing 3D output objects are not necessarily bio-safe in an uncured state (e.g., "the ink is bad for your health"), hazards to handling personnel may be introduced by a failure to completely cure a surface of the finished 3D output object.

It may be advantageous to provide systems, methods, techniques, processes and schemes that can better assure proper curing of internal layering of an in-process 3D object, and a surface of a finished 3D output object without requiring a post-curing coating process.

Exemplary embodiments of the systems and methods according to this disclosure may use controllable UV light to irradiate specific pixels of UV ink from a multiple layer (multi-layer) history and/or history profile to address curing issues that are unique to the production of 3D printed parts.

Exemplary embodiments may provide addressable curing in order to properly cure individual layers in a 3D printed object as that object is being printed. The use of addressable curing is intended to ensure proper curing of individual layers and/or layered components regardless of the color or a thickness of the individual layered components in the 3D printed object.

In embodiments, the addressable curing may be undertaken on a pixel-by-pixel basis in each layer.

Exemplary embodiments may employ a layer-by-layer history by which to adjust an intensity of an addressable curing unit to provide complete curing to a particular layer without introducing damaging effects that may be caused by over curing the particular layer. It may be appropriate to consult this layer-by-layer history because the applied light, including UV light, will differently penetrate a number of layers based on constitutions and/or colors of the individual layers in the number of layers to be penetrated by the light for curing. The light may penetrate, for example, twenty plus layers of clear ink, while only penetrating a few layers of black or other dark colored ink.

Exemplary embodiments may address the challenges of correct curing 3D printed parts that substantially all UV ink 3D printers encounter. In embodiments, concerns about curing 3D output objects thoroughly enough, without over curing, are addressed for a wide range of UV ink colors available for use in 3D printers.

Exemplary embodiments may employ controllable UV light (exposure) to irradiate specific pixels of UV ink. The UV light exposure may be controlled using a multi-layer ink deposition history that is unique to each of a plurality of 3D printed parts.

Exemplary embodiments of the systems and methods according to this disclosure may provide addressable curing in order to properly cure individual layers in a 3-D printed object as that object is being printed. The use of addressable curing is intended to ensure proper curing of individual layers and/or layered components regardless of the color or a thickness of the individual layered components in the 3-D object.

In embodiments, the addressable curing may be undertaken on a pixel-by-pixel basis in each layer. Separately, each exposure unit, such as, for example, each light emitting diode (LED) in an LED-based exposure array, may cover several adjacent pixels and apply a curing intensity based on an average pigment of the several adjacent pixels in a single or multiplicity of layers.

Exemplary embodiments may employ a layer-by-layer history by which to adjust an intensity of an addressable curing unit to provide complete curing to a particular layer without introducing damaging effects that may be caused by over curing the particular layer. It is appropriate to consult this layer-by-layer history because the applied light, including UV light, will differently penetrate a number of layers based on constitutions and/or colors of the individual layers in the number of layers. The light may penetrate, for example, twenty plus layers of clear ink, while only penetrating a few layers of black ink These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing adjustable curing of UV light or photo curable ink layers in the formation and/or manufacture of 3D printed parts and components, particularly those parts and components formed in 3D jetted ink printing systems, according to this disclosure, will be described, in detail, with reference to the following drawings, in which.

DETAILED DESCRIPTION OF EMBODIMENTS

Figure 1:
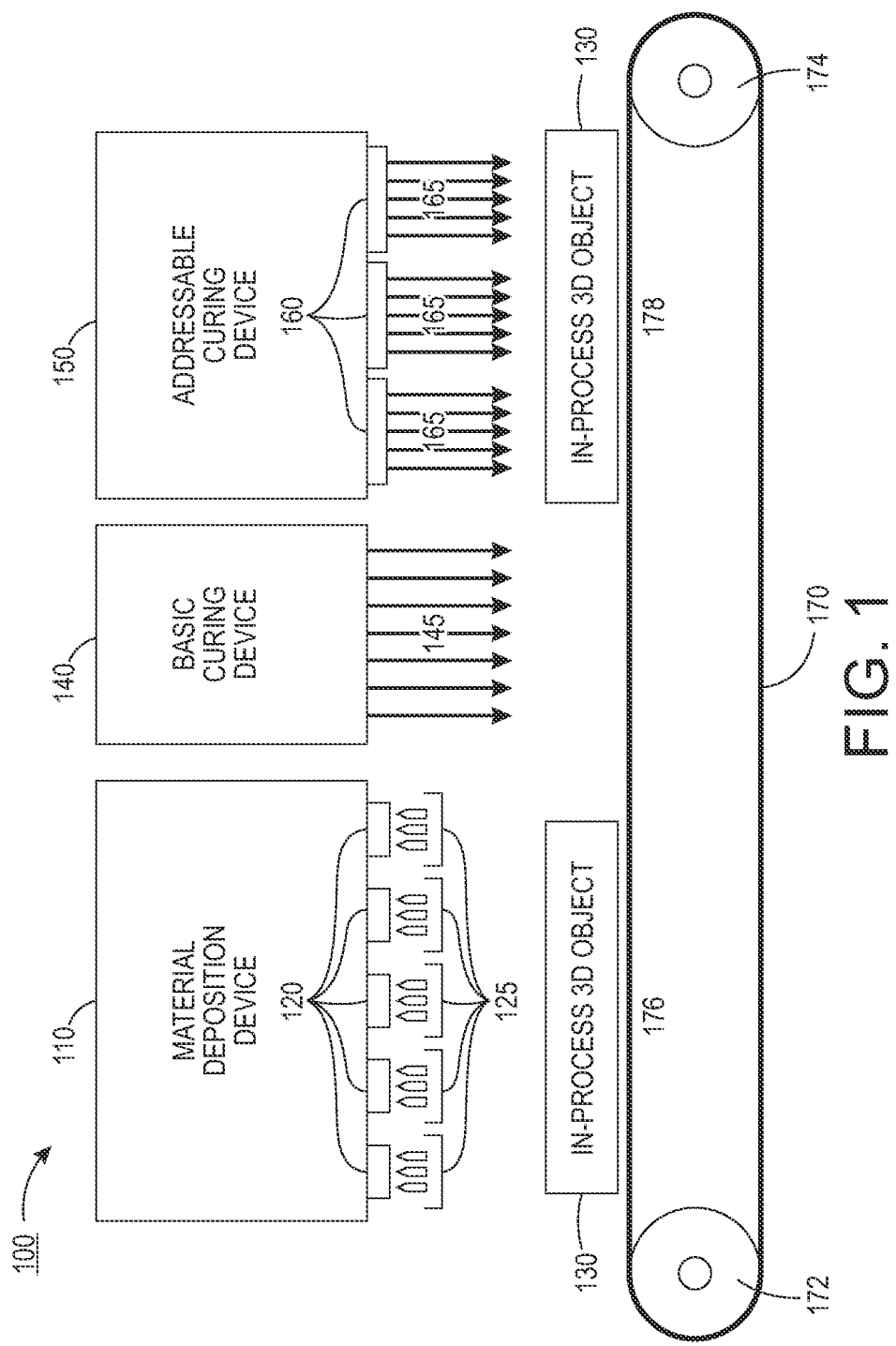
FIG. 1 illustrates a block diagram of an exemplary jetted ink 3D object forming system including an addressable curing device according to this disclosure.

The systems and methods for implementing adjustable curing of UV light or photo curable ink layers in the formation and/or manufacture of 3D printed parts and components, particularly those parts and components formed in 3D jetted ink printing systems, according to this disclosure will generally refer to these specific utilities for those systems and methods. Exemplary embodiments described and depicted in this disclosure should not be interpreted as being specifically limited to any particular configuration a 3D object forming system, individual material deposition components within a 3D object forming system, or control and/or processing components for controlling 3D object forming within a 3D object forming system, and to any particular configuration of such a 3D object forming system including an addressable object curing component for selectively curing one or more layers of the in-process 3D object during formation or manufacture. It should be recognized that any advantageous use of the system and methods for applying addressable and/or selective discrete curing to portions of an in process 3D object employing devices and schemes such as those discussed in detail in this disclosure is contemplated as being included within the scope of the disclosed exemplary systems and methods.

The systems and methods according to this disclosure will be described as being particularly adaptable to use for 3D object forming in a 3D printer employing jetted inks as the material deposited on a platform for the forming of the 3D object. These references are meant to be illustrative only in providing a single real-world utility for the disclosed systems and methods, and should not be considered as limiting the disclosed systems and methods to any particular product or combination of devices, or to any particular type of 3D printer in which the described and depicted addressable curing devices and schemes may be advantageously employed. Any commonly-known processor-controlled 3D object forming device in which the processor may direct variable curing of discrete portions of an in-process 3D object that may be adapted according to the specific capabilities discussed in this disclosure is contemplated.

The disclosed embodiments are intended, among other objectives, to provide a "correct" curing of 3D printed parts formed in 3D printers, addressing a challenge that many 3D printers, and particularly UV curable ink 3D printers conventionally encounter. An objective is to provide a level of curing that is thorough enough to effectively cure all components of the 3D object without over-curing, across a broad and varied range of UV curable ink colors and compositions that are available for use in 3D printers. The disclosed schemes, processes, methods and techniques, and the systems and devices supporting their implementation, may advantageously provide controllable UV light, irradiation and/or exposure to irradiate specific discrete portions of an in-process 3D object formed by a 3D printer including such detail as even irradiating individual pixels and/or groups of pixels of the UV curable ink based on information obtained from a multi-layer history of the UV curable inks disposed in the particular discrete portions in a manner that is unique to 3D printed parts, components and/or objects.

When printing with UV curable inks, correctly curing the inks is tremendously important. Large inconsistencies in curing can cause the UV curable inks to still be liquid, or to have problems displaying the correct color gamut in individual portions of the UV curable ink layers. In 3D object forming, 3D printing and/or additive manufacturing, the degree of curing is important in that even decidedly small variations from the ideal curing and/or curing exposure may adversely affect physical properties of the formed 3D object like tensile strength, impact strength, and hardness. Additionally, because certain of the UV curable inks, ink components and/or ink solutions are not biologically or microbially neutral, failure to properly surface cure the formed 3D object may result in a hazard to individuals handling the insufficiently cured object.

The disclosed schemes then address the challenges by discretely correctly curing identifiable portions of the in-process 3D objects even down to a pixel by pixel level in individual layers and groups of layers according to the multi-layer history. In embodiments, a layer-by-layer history may be accumulated for individual layers of jetted or otherwise deposited object forming material in the 3D object forming scheme. This layer-by-layer history may be stored in a memory component associated with the 3D image forming scheme. Discrete portions of the in-process 3D object may be identified. A multi-layer history of those discrete portions may be analyzed. For individual pixels, appropriate levels of UV curing radiation or illumination may be determined. For curing arrays, including LED UV curing arrays, average levels of UV curing radiation or illumination may be determined among a plurality of pixels covered by individual elements of the UV curing arrays. The UV curing radiation, it is recognized, will penetrate multiple layers in the 3D object.

FIG. 1 illustrates a block diagram of an exemplary jetted ink 3D object forming system 100 including an addressable curing device 150 according to this disclosure. As shown in FIG. 1, the exemplary system 100 may include a material deposition device 110 for delivering deposition material 125 from one or more individual material deposition components 120 onto some manner of base component 170. The deposition material 125 may be in the form of UV curable inks of different colors and compositions. The one or more individual material deposition components 120 may be in the form of inkjet devices or heads for jetting different colors and compositions of UV curable inks onto the base component 170.

The base component 170 may be in the form of some movable platform for transporting an in-process 3D object 130 formed by the exemplary system 100 between a material deposition position 176 and a curing position 178. As depicted, the base component 170 is in the form of a belted component that may be movable between the various positions around one or more powered or following rollers 172, 174. The in-process 3D object 130 may be made to travel under the individual material deposition components, e.g., print heads, to have successive layers of the deposition material 125 added.

In embodiments, a basic curing device 140 may be included to provide some base level of curing radiation 145, including UV curing radiation via, for example, a low level UV lamp. An addressable curing device 150 may be included to provide particularized and independently adjustable curing radiation 165, including UV curing radiation via, for example, individual discretely directed adjustable curing heads or lamps 160, for bringing individual areas of the in-process 3D object, and or layers forming the in-process 3D object up to a higher threshold, yet controlled, level of UV curing radiation as is appropriate to the multi-layer history of individual layers in each of the individual areas. In this manner, the particularized curing radiation 165 may be adjusted based on applying the multi-layer history of recently printed layers in a particular area of the in-process 3D object to be exposed and cured by the particularized curing radiation 165. In embodiments, all of the curing radiation provided to an in-process 3D object 130 may be provided by the addressable curing device 150, with no need for inclusion of any basic curing device 140. In embodiments, the individual discretely directed adjustable curing heads or lamps 160 associated with the addressable curing device 150 may be in a form of, for example, light emitting diode (LED) components or arrays, laser-type curing components, or other UV curing radiation providing components.

Figure 2:
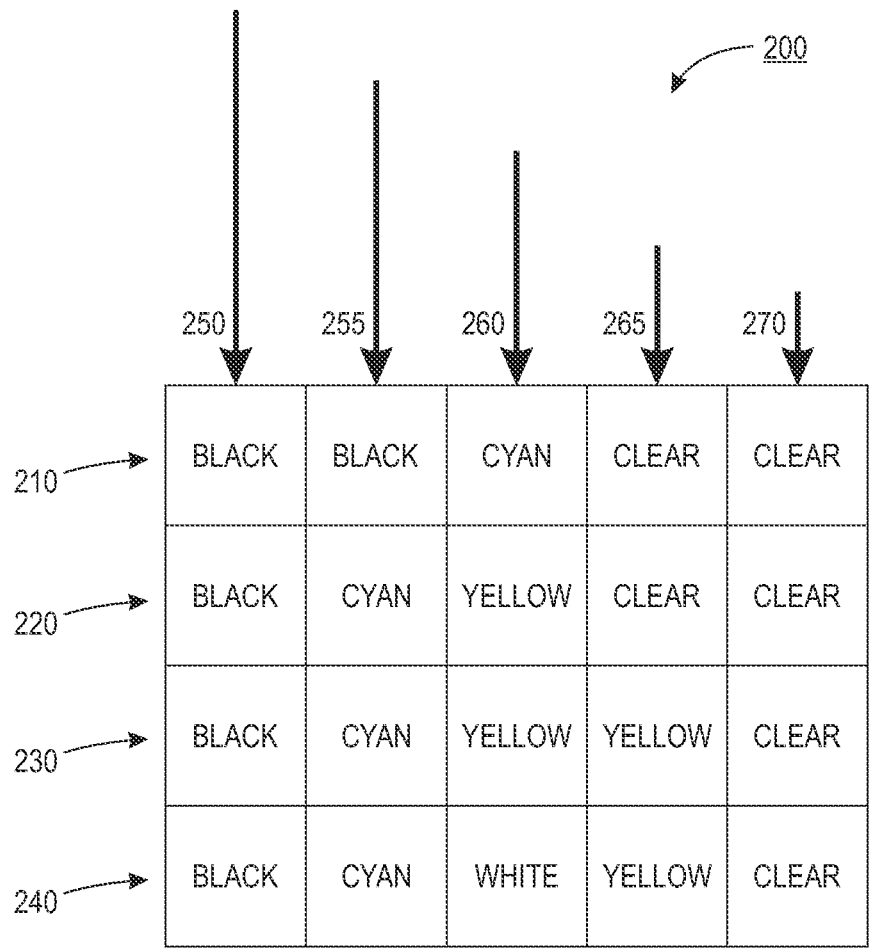
FIG. 2 illustrates an exemplary layer overview that may constitute a multi-layer history on which an addressable curing scheme according to this disclosure may be based.

FIG. 2 illustrates an exemplary layer overview 200 that may constitute a multi-layer history on which an addressable curing scheme according to this disclosure may be based. As shown in FIG. 2, a sample cross section of four layers 210-240 of printed ink from a 3D printer constituting a multi-layer history may be analyzed, assessed and stored in the 3D printer for processing by the 3D printer in determining correct levels of variable curing radiation 250-270 to be applied to discrete portions of the layers of the in-process 3D object of which the exemplary multi-layer history may form a section. In formulation of the in-process 3D object, it is reasonable to presume that the lower two or three layers 220-240, as shown, may have already been exposed to partial or essentially-complete curing by one or more curing lamps directed at discrete portions of the in-process 3D object constituted of the multiple layers 210-240. The top layer 210, however, just having been printed, may be first exposed to a level of curing by being passed under an addressable curing device (such as that shown in FIG. 1) immediately after having been deposited on the underlying layers 220-240. The individually addressable UV curing components or lamps may be individually controlled to provide varying levels of radiation 250-270 to discrete portions of the layered component based on the layer-by-layer history of each individually addressable area or otherwise discrete portion of the in-process 3D printed part, object or component.

For example, the column of layers in the left of FIG. 2 to be acted upon by the variable radiation level 250 shows one extreme case where many layers of black together would require the most UV energy applied in order to cure. In varying degrees as shown, a layer where black is printed on top of cyan would require slightly less total energy (see radiation level 255); a layer where cyan is printed on top of multiple layers of lighter colors including yellow and/or white would require even less total energy (see radiation level 260); one or more clear layers printed on top of multiple layers of lighter colors including yellow would require, in turn, further decrease the energy (see radiation level 265); and at another extreme, multiple layers of clear would require a least amount of UV energy to penetrate down several layers (see radiation level 270). It should be noted that, although depicted as four layers in the exemplary layer overview 200 shown in FIG. 2, this depiction is done for illustration purposes only. There is, for example, virtually no restriction on the multi-layer history that is developed, analyzed and/or stored according to the disclosed schemes for setting radiation levels of the addressable curing device. In other words, the disclosed schemes are not restricted to, for example, four layers, as shown. Depending on the physical properties of the ink, including jetted ink, being used in a 3D printer, the UV light may propagate through different numbers of layers and the layer-by-layer analysis would correctly account for these physical properties in order to provide setting values for the addressable radiation to properly cure the discrete portions of the in-process 3D object. Certain setting parameters may be arrived at, and stored in the 3-D printer, based on testing of the curing and layer propagation effects of various combinations of ink layers containing specific physical properties in the employed inks.

According to the disclosed schemes, employing an addressable UV curing device combined with the multi-layer history controls would allow each in-process or completed 3D printed part, object or component to be cured completely and uniformly inside the 3D printed part, object or component with a "correct" amount of integrated curing energy for each ink being printed. This may result in 3D printed parts, objects or components being produced with the optimal physical properties such as tensile strength, while minimizing a number of failures, including cohesive or adhesive layer failures, and other detrimental effects based on improper partial curing of discrete portions or pockets within the in-process or finished 3D printed part, object or component.

Succinctly put, the disclosed embodiments improve on conventional 3D part, object or component forming/manufacturing systems, including 3D printers, by applying particularized addressable curing to individual portions of an in process 3D part, object or component during the forming or manufacturing process in order to improve structural and surface integrity of the finished 3D part, object or component. The disclosed embodiments may provide an improved functionality 3D printer by minimizing overall radiation requirements for UV curing based on an ability to increase and decrease UV curing radiation-based on the multi-layer history, thereby generally avoiding over curing or under curing in any particular discrete portion of an in-process or finished 3D part, object or component. Understanding that, based on a multi-layer composition of the layers in any particular discrete portion of the in-process 3D part, object or component, a constant level of UV curing radiation may penetrate only a few dark layers or may penetrate many lighter or clear layers, application of such a constant level of UV curing radiation may result in randomly variable curing of particular discrete portions of the in-process 3D part, object or component. This randomly variable curing may affect not only structural properties of the finished 3D part, object or component, but may also affect aesthetic properties of the finished 3D part, object or component, including variable color properties of the finished 3D part, object or component. Analysis of a multi-layer history for a plurality of deposited layers forming the 3D part, object or component, and automated adjustment of an addressable curing device according to that analysis, render the disclosed schemes unique over conventional 3D printing and object curing techniques. References to individually colored inks, as captured above, are intended to provide one exemplary property of the disclosed inks to be operated upon by an addressable curing device. The multi-layer history may be equally applicable to determining only a penetration scheme for single-color components, and/or for 3D printers that are capable of only depositing a single color of deposition material at one time. As an example, in a 3D printer that is capable of producing only single-color components, an addressable curing device may still find significant utility in varying a curing energy for curing a 3D part, object or component that is printed with all black ink as compared to curing a 3D part, object or component that may be printed by the same 3D printer in another printing ablution using only clear ink. The discrete portion addressability of the disclosed curing schemes may also be employed to properly cure relatively thicker (body) portions, comprising a comparatively larger number of layers, of a particular 3D part, object or component and relatively thinner (edge, lip or flange) portions, comprising a comparatively smaller number of layers, of the particular 3D part, object or component. Conventional curing systems may under cure the relatively thicker portions (affecting structural integrity), while over curing the relatively thinner portions to a point of inducing warping or other distortion, or even to a point of damage or structural failure, in the relatively thinner portions. Also, references to properties of the jetted ink materials may include, but not be limited to, for example, additive fluorescent materials, additive pearlescent materials, additive metal flake materials, additive magnetic ink character recognition (MICR) materials and other ink additive materials that may be usable for developing certain aesthetic characteristics in the finished 3D part, object or component.

Figure 3:
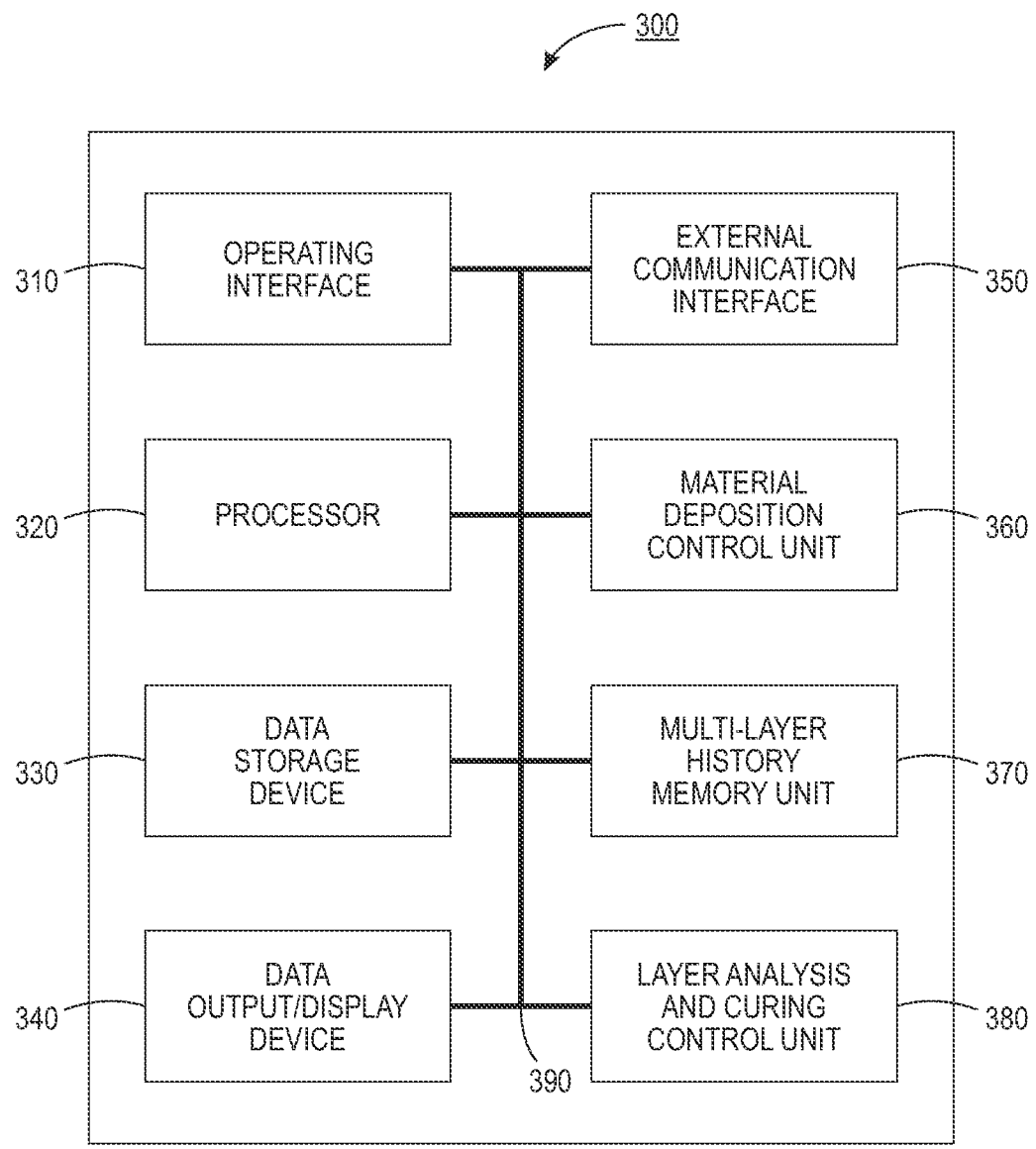
FIG. 3 illustrates a block diagram of an exemplary control system for implementing a 3D object forming scheme including addressable curing of layers in an in-process 3D object according to this disclosure.

FIG. 3 illustrates a block diagram of an exemplary control system 300 for implementing a 3D object forming scheme including addressable curing of layers in an in-process 3D object according to this disclosure. As shown in FIG. 3, the exemplary control system 300 is usable to manage 3D object forming operations in a 3D printer.

The exemplary control system 300 may include an operating interface 310 by which a user may communicate with the exemplary control system 300. The operating interface 310 may be a locally-accessible user interface associated with the 3D object forming device. The operating interface 310 may be configured as one or more conventional mechanisms common to control devices and/or computing devices that may permit a user to input information to the exemplary control system 300. The operating interface 310 may include, for example, a conventional keyboard, a touchscreen with "soft" buttons or with various components for use with a compatible stylus, a microphone by which a user may provide oral commands to the exemplary control system 300 to be "translated" by a voice recognition program, or other like device by which a user may communicate specific operating instructions to the exemplary control system 300. The operating interface 310 may be a part of a function of a graphical user interface (GUI) mounted on, integral to, or associated with, the 3D object forming device with which the exemplary control system 300 is associated.

The exemplary control system 300 may include one or more local processors 320 for individually operating the exemplary control system 300 and for carrying into effect control and operating functions for 3D object forming, and specifically for implementing an addressable curing scheme, employing an addressable curing component, for the 3D object forming in a 3D printer with which the exemplary control system 300 may be associated. Processor(s) 320 may include at least one conventional processor or microprocessor that interprets and executes instructions to direct specific functioning of the exemplary control system 300, and control of the 3D object forming process with the exemplary control system 300.

The exemplary control system 300 may include one or more data storage devices 330. Such data storage device(s) 330 may be used to store data or operating programs to be used by the exemplary control system 300, and specifically the processor(s) 320. Data storage device(s) 330 may be used to store information regarding, for example, particular levels of intensity in curing irradiation or energy, including variable levels of intensity to be applied by an addressable curing component in a 3D printer, to be applied to an in-processed 3D object printed by the 3D printer, based on a composition of multiple layers in a discrete portion of the 3D object that may be identified and analyzed according to the disclosed schemes. The stored particular levels of intensity may be based on test data provided by a manufacturer and/or supplier of the 3D printer. Data storage device(s) 330 may be used alternatively or additionally to store information regarding a layer-by-layer (or multi-layer) history regarding the deposition of individual layers of 3D object forming material on a base component in the 3D printer. As described throughout this disclosure, it is this multi-layer history, which may be stored in the data storage device(s) 330, even on a temporary basis during the 3D object forming operation in the 3-D printer, that may form a basis for specifying an addressable intensity of curing radiation to discrete portions of the in-process 3D object formed by the 3D printer.

The data storage device(s) 330 may include a random access memory (RAM) or another type of dynamic storage device that is capable of storing updatable database information, and for separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary control system 300, or may be provided external to, and in wired or wireless communication with, the exemplary control system 300, including as cloud-based storage components.

The exemplary control system 300 may include at least one data output/display device 340, which may be configured as one or more conventional mechanisms that output information to a user, including, but not limited to, a display screen on a GUI of the 3D object forming device with which the exemplary control system 300 may be associated. The data output/display device 340 may be used to indicate to a user a status of a 3D object forming operation of a 3D printer with which the exemplary control system 300 may be associated including an operation of one or more individually addressable curing components, or an overall addressable curing device, for applying varying levels of curing radiation intensity to an in-process 3D object being formed by the 3D printer.

The exemplary control system 300 may include one or more separate external communication interfaces 350 by which the exemplary control system 300 may communicate with components external to the exemplary control system 300. At least one of the external communication interfaces 350 may be configured as an output port to support connection to, and/or communication with, for example, a 3D object forming device, such as a 3D printer, with which the exemplary control system 300 may be associated. Any suitable data connection to provide wired or wireless communication between the exemplary control system 300 and external and/or associated components is contemplated to be encompassed by the depicted external communication interface 350.

The exemplary control system 300 may include a material deposition control unit 360 that may be used to control the deposition of material in layers to form an in-process 3D object. The material deposition control unit 360 may receive input digital data regarding a 3D object to be printed by the 3D printer with which the exemplary control system 300 may be associated. The received input digital data may come from any data source via, for example, the external communication interface 350. Either of the processor 320 or the material deposition control unit 360 itself may parse the received input digital data into a layer-by-layer scheme for depositing one or more colors or types of object forming material on an object forming base in the 3D printer. The material deposition control unit 360 may then direct the deposition of the object forming material from specific material outputs in the material deposition device, including inks jetted, in layers, from jetted ink material deposition heads or nozzles in the material deposition device.

The exemplary control system 300 may include a multi-layer history memory unit as a stand-alone component, or as a component, function, or storage space in one or more of the data storage devices 330. The multi-layer history memory unit 370 may be usable to store, at least temporarily, a record of the layer-by-layer scheme for depositing the one or more colors or types of object forming material on the object forming base in the 3D printer. This stored record may be available for additional analysis by the processor 320, or the layer analysis and curing control unit 380 discussed below, to determine control inputs for implementing an addressable radiation energy radiation scheme from an addressable curing device in the 3D printer according to the processes and techniques discussed in detail above.

The exemplary control system 300 may include a layer analysis and curing control unit 380 for analyzing a collected and/or stored multi-layer history for the one or more deposited layers of object forming material that form the in-process 3D object in the 3D printer with which the exemplary control system is associated. The layer analysis and curing control unit 380 may operate as a part of the processor 320 coupled to, for example, one or more data storage devices 330, or as a separate stand-alone component module or circuit in the exemplary control system 300.

All of the various components of the exemplary control system 300, as depicted in FIG. 3, may be connected internally, and to one or more 3D object forming devices, by one or more data/control busses 390. These data/control busses 390 may provide wired or wireless communication between the various components of the exemplary control system 300, whether all of those components are housed integrally in, or are otherwise external and connected to a 3D object forming device or 3D printer with which the exemplary control system 300 may be associated.

It should be appreciated that, although depicted in FIG. 3 as an integral unit, the various disclosed elements of the exemplary control system 300 may be arranged in any combination of sub-systems as individual components or combinations of components, integral to a single unit, or external to, and in wired or wireless communication with the single unit of the exemplary control system 300. In other words, no specific configuration as an integral unit or as a support unit is to be implied by the depiction in FIG. 3. Further, although depicted as individual units for ease of understanding of the details provided in this disclosure regarding the exemplary control system 300, it should be understood that the described functions of any of the individually-depicted components may be undertaken, for example, by one or more processors 320 connected to, and in communication with, one or more data storage device(s) 330.

Figure 4:
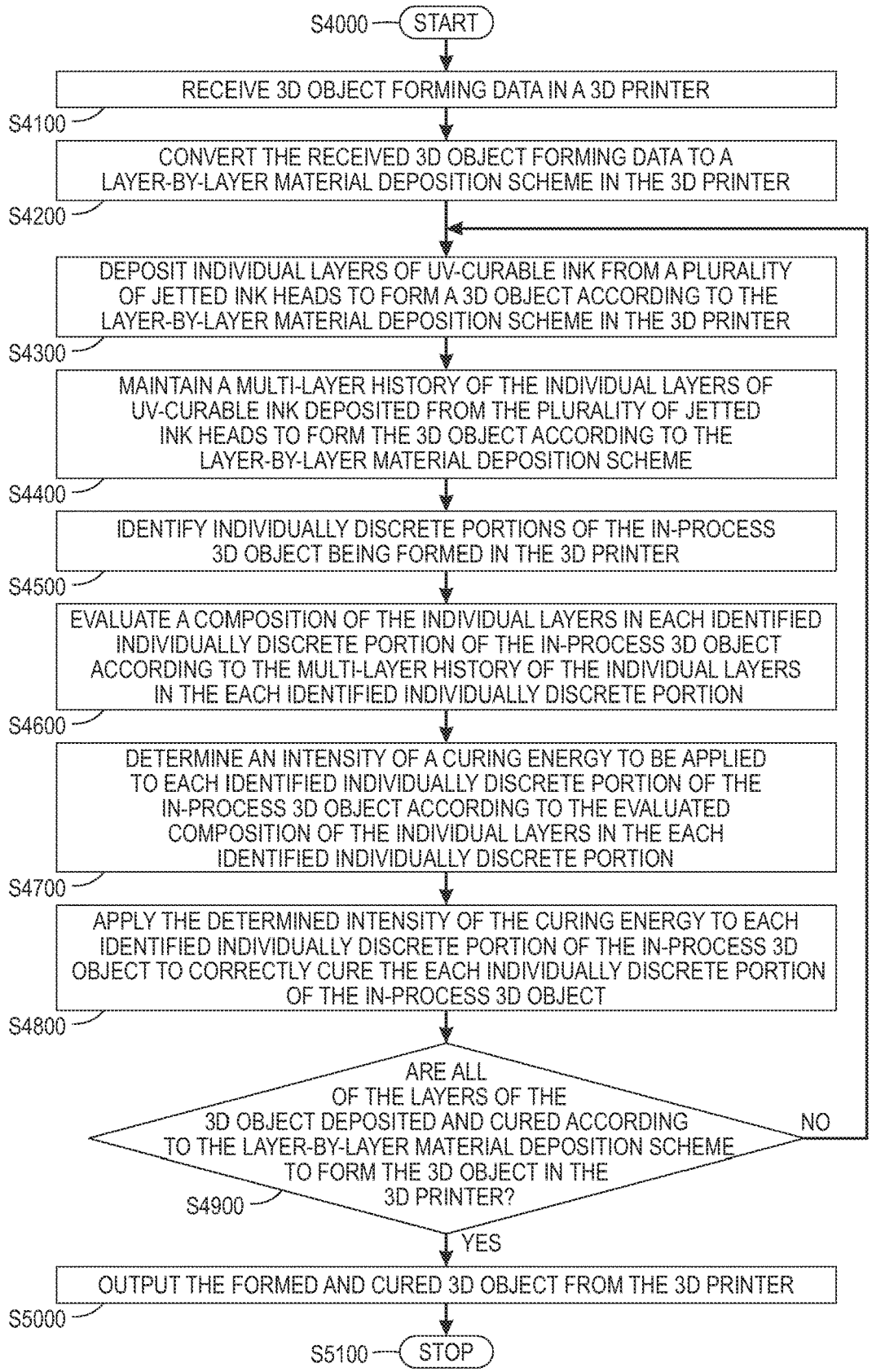
FIG. 4 illustrates a flowchart of an exemplary method for implementing a 3D object forming scheme including addressable curing of layers in an in-process 3D object according to this disclosure.

The disclosed embodiments may include an exemplary method for implementing a 3D object forming scheme including addressable curing of layers based on a multi-layer history for a 3D object. FIG. 4 illustrates a flowchart of such an exemplary method. As shown in FIG. 4, operation of the method commences at Step S4000 and proceeds to Step S4100.

In Step S4100, 3D object forming data may be received from a data source in a 3D printer, or in a control component associated with a 3D printer. Operation of the method proceeds to Step S4200.

In Step S4200, the received 3D object forming data may be parsed or otherwise converted into a layer-by-layer deposition scheme for the depositing of one or more colors and/or types of object forming material on an object forming base to produce an in-process 3D object in the 3D printer. Operation of the method proceeds to Step S4300.

In Step S4300, individual layers of UV curable ink may be deposited from a plurality of jetted ink heads or nozzles to form an in-process 3D object according to the layer-by-layer material deposition scheme executed in the 3D printer. Operation of the method proceeds to Step S4400.

In Step S4400, a multi-layer history of the individual layers of UV curable ink deposited from the plurality of jetted ink heads or nozzles to form the in-process 3D object according to the layer-by-layer material deposition scheme may be collected and maintained, for example, in a data storage device in the 3D printer. Operation of the method proceeds to Step S4500.

In Step S4500, individually discrete portions of the in-process 3D object being formed in the 3D printer may be identified. Operation of the method proceeds to Step S4600.

In Step S4600, a composition of the individual layers in each identified individually discrete portion of the in-process 3D object deposited according to the multi-layer history of the individual layers in each identified individually discrete portion may be evaluated. An objective of this evaluation is to obtain, at a pixel level or in a multi-pixel level, a constitution of the layers making up the each identified individually discrete portion of the in-process 3D object. Operation of the method proceeds to Step S4700.

In Step S4700, an intensity of a curing energy to be applied to the each individually discrete portion of the in-process 3D object may be determined based on the evaluated composition of the individual layers in each identified individually discrete portion of the in-process 3D object. As is discussed in detail above, this determination may take into account characteristics of the materials deposited in the layers including colors and/or material constituents of the deposited materials, including UV curable inks, to provide a correct curing of the deposited material layers in the each identified individually discrete portion of the in-process 3D object. Operation of the method proceeds to Step S4800.

In Step S4800, the determined intensity of the curing energy may be applied to each identified individually discrete portion of the in-process 3D object to correctly cure each identified individually discrete portion of the in-process 3D object. Operation of the method proceeds to Step S4900.

Step S4900 is a determination step in which it is determined whether all of the layers of the in-process 3D object have been deposited and cured according to the layer-by-layer material deposition scheme to form the 3D object in the 3D printer.

If in Step S4900 it is determined that all of the layers of the in-process 3D object have not been deposited and cured according to the layer-by-layer material deposition scheme, operation of the method may revert to Step S4300.

If in Step S4900 it is determined that all of the layers of the in-process 3D object have been deposited and cured according to the layer-by-layer material deposition scheme, operation of the method proceeds to Step S5000.

It is possible that all layers of an in-process 3D object have been deposited, but all layers may not be fully cured. In this case, the method may revert to Step S4400 in order to provide one or more final curing operations before the 3D object forming operation is fully completed.

In Step S5000, the formed and cured 3D object may be output from the 3D printer. Operation of the method proceeds to Step S5100, where operation of the method ceases.

As indicated above, the method may positively provide a previously unachievable level of control of the correct curing of all elemental parts and/or individually discrete portions of the 3D object formed in the 3D printer.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable operating, product processing and 3D object forming or additive manufacturing environments in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by processors.

Those skilled in the art will appreciate that other embodiments of the disclosed subject matter may be practiced in additive manufacturing devices, including 3D printers, of many different configurations.

As indicated above, embodiments within the scope of this disclosure may include computer-readable media storing computer-executable instructions or data structures that can be read and executed by one or more processors for controlling addressable curing. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represent one example of a corresponding sequence of acts for implementing the functions described in the steps of the above-outlined exemplary method. The exemplary depicted steps may be executed in any reasonable order to carry into effect the objectives of the disclosed embodiments. No particular order to the disclosed steps of the method is necessarily implied by the depiction in FIG. 4, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

I claim:

1. A method for producing 3D printed parts in a 3D printing device, comprising
    depositing layers of object forming material on an object forming base to form a 3D printed part;
    collecting, with a processor, layer-by-layer information for a plurality of deposited layers forming the 3D printed part to develop a layer history for at least a portion of the 3D printed part;
    automatically determining, with the processor, a level of curing energy for curing the at least the portion of the 3D printed part based on the developed layer history for the at least the portion of the 3D printed part;
    wherein the determining a level of curing energy is based on color and composition of the deposited object forming material;
    controlling, with the processor, at least one curing device to emit the determined level of curing energy;
    wherein the at least one curing device is an adjustable intensity curing device or a basic curing device;
    wherein the basic curing device provides a base level of curing radiation;
    wherein adjustable intensity curing device provides particularized and independently adjustable curing radiation;
    wherein the adjustable intensity curing device comprising one or more individual curing energy emitting components;
    wherein the one or more individual curing energy emitting components curing comprising at least one of a lamp, a laser, and an LED;
    curing the at least the portion of the 3D printed part by exposing the surface of the 3D printed part to the determined level of curing energy emitted from the at least one curing device;
    wherein curing the at least the portion of the 3D printed part comprises applying curing energy on individual pixels and/or groups of pixels;
    storing curing energy level data for a plurality of object forming materials and layer-by-layer constitutions of individual layers of the plurality of object forming materials in a data storage device,
    wherein the automatically determining the level of curing energy comprising referencing the stored curing energy level data for the at least the portion of the 3D printed part to be cured based on the developed layer history for the at least a portion of the 3D printed part;
    determining if all of the layers have been deposited and cured in accordance with a layer-by-layer material deposition method;
    wherein the object forming material being a plurality of differently constituted UV curable ink materials;
    in response to the determination that all of the layers have not been deposited or cured, then repeating depositing layers of object forming material and then curing or curing the determined layers that have not been cured before completing the 3D printed part.

2. The method of claim 1,
    wherein the adjustable intensity curing device comprising a lamp.

3. The method of claim 1, the object forming material being a UV curable ink material.

4. The method of claim 1, the object forming material being at least one of (1) a plurality of different colored UV curable ink materials and (2) a plurality of differently constituted UV curable ink materials.

5. The method of claim 1, wherein the adjustable intensity curing device comprising an LED.

6. The method of claim 1, the one or more individual curing energy emitting components being configured to emit the curing energy to a surface of one or more layers of the object forming material in the 3D printed part on a pixel-by-pixel basis.

7. The method of claim 6, further comprising:
    dividing a surface of the deposited layers of the 3D printed part into a plurality of discrete portions with the processor;
    determining the level of curing energy for curing each of the plurality of discrete portions based on the developed layer history for the each of the plurality of discrete portions, and
    adjusting, with the processor, the curing energy curing energy emitted from the adjustable intensity curing device to the determined level to cure each of the plurality of discrete portions of the 3D printed part.

8. The method of claim 7, further comprising analyzing, with the processor, the each of the plurality of discrete portions on a pixel-by-pixel basis to determine the level of curing energy for curing the each of the plurality of discrete portions.

* * * * *